(12) United States Patent
Rashley et al.

(10) Patent No.: US 11,358,895 B2
(45) Date of Patent: Jun. 14, 2022

(54) BATCH CHARGER FOR A MELTING CHAMBER

(71) Applicant: Owens-Brockway Glass Container Inc., Perrysburg, OH (US)

(72) Inventors: Shane T. Rashley, Bowling Green, OH (US); Zhongming Wang, Ypsilanti, MI (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 224 days.

(21) Appl. No.: 16/192,196

(22) Filed: Nov. 15, 2018

(65) Prior Publication Data

US 2020/0156979 A1 May 21, 2020

(51) Int. Cl.
| | | |
|---|---|---|
| C03B 3/00 | (2006.01) | |
| C03B 3/02 | (2006.01) | |
| C03B 5/235 | (2006.01) | |
| C03B 5/44 | (2006.01) | |
| F27D 3/08 | (2006.01) | |

(52) U.S. Cl.
CPC ............... *C03B 3/005* (2013.01); *C03B 3/02* (2013.01); *C03B 3/026* (2013.01); *C03B 5/2356* (2013.01); *C03B 5/44* (2013.01); *F27D 3/08* (2013.01)

(58) Field of Classification Search
None
See application file for complete search history.

(56) References Cited

U.S. PATENT DOCUMENTS

| | | |
|---|---|---|
| 1,761,229 A | 6/1930 | Pedersen |
| 1,905,534 A | 4/1933 | Wadman |
| 1,999,761 A | 4/1935 | Howard |
| 2,479,805 A | 8/1949 | Batchell |
| 2,749,666 A | 6/1956 | Baque |
| 3,039,231 A | 6/1962 | Augsburger et al. |
| 3,170,781 A | 2/1965 | Keefer |
| 3,573,337 A | 4/1971 | Grimm et al. |
| 3,592,623 A | 7/1971 | Shepherd |

(Continued)

FOREIGN PATENT DOCUMENTS

| | | |
|---|---|---|
| CN | 107935358 A | 4/2018 |
| DE | 19532587 A1 | 3/1997 |

(Continued)

OTHER PUBLICATIONS

PCT Search Report and Written Opinion, Int. Serial No. PCT/US2019/058699, Int. Filing Date: Oct. 30, 2019 Applicant: Owens-Brockway Glass Container Inc., dated Jan. 29, 2020.

(Continued)

*Primary Examiner* — Lisa L Herring

(57) ABSTRACT

A feed assembly for a melting chamber having a plurality of walls and at least one submerged burner, and related methods of its operation are disclosed. The feed assembly includes a tubular body being hollow and having a first end and extending to a second end. The second end is for connecting to one of the plurality of walls. The tubular body further includes a port proximate the second end wherein the port has a first port end and tapers radially inwardly to a second port end at the second end. The feed assembly also has a batch charger disposed within the tubular body and having a first charger end and extending to a second charger end.

16 Claims, 2 Drawing Sheets

(56) References Cited

U.S. PATENT DOCUMENTS

| | | | |
|---|---|---|---|
| 4,226,564 | A | 10/1980 | Takahashi et al. |
| 4,290,797 | A | 9/1981 | Rossi |
| 4,381,934 | A | 5/1983 | Kunkle et al. |
| 4,594,089 | A | 6/1986 | Kurata |
| RE32,317 | E | 12/1986 | Kunkle et al. |
| 4,636,127 | A * | 1/1987 | Olano ............... C21B 13/105 34/183 |
| 4,654,068 | A | 3/1987 | Kunkle et al. |
| 4,789,990 | A | 12/1988 | Pieper |
| 4,929,266 | A | 5/1990 | Cozac et al. |
| 5,057,140 | A | 10/1991 | Nixon |
| 5,078,777 | A | 1/1992 | Cozac et al. |
| 5,672,190 | A | 9/1997 | Litka et al. |
| 5,979,191 | A | 11/1999 | Jian |
| 6,532,768 | B1 | 3/2003 | Labrot et al. |
| 6,723,208 | B1 | 4/2004 | Hansen |
| 7,024,888 | B2 | 4/2006 | Rake et al. |
| 8,707,740 | B2 | 4/2014 | Huber et al. |
| 9,394,192 | B2 | 7/2016 | Villeroy De Galhau et al. |
| 2003/0202368 | A1 * | 10/2003 | Ierymenko ......... H02M 1/4208 363/125 |
| 2005/0236747 | A1 | 10/2005 | Rue et al. |
| 2007/0277556 | A1 | 12/2007 | Forjahn et al. |
| 2008/0121497 | A1 * | 5/2008 | Esterson ............... F27D 3/08 198/657 |
| 2008/0276652 | A1 | 11/2008 | Bauer et al. |
| 2009/0158777 | A1 * | 6/2009 | Tenzler ............... C03B 5/005 65/134.4 |
| 2009/0176639 | A1 | 7/2009 | Jacques et al. |
| 2011/0236846 | A1 | 9/2011 | Rue et al. |
| 2013/0086950 | A1 | 4/2013 | Huber et al. |
| 2013/0202368 | A1 * | 8/2013 | Ehring ............... B65G 53/48 406/56 |
| 2014/0090423 | A1 | 4/2014 | Charbonneau et al. |
| 2015/0013386 | A1 * | 1/2015 | Villeroy De Galhau .................... C03B 5/2353 65/28 |
| 2015/0307382 | A1 | 10/2015 | Wang et al. |
| 2018/0002213 | A1 | 1/2018 | Demott et al. |
| 2018/0057387 | A1 * | 3/2018 | Faulkinbury ......... C03B 5/2356 |
| 2018/0057837 | A1 * | 3/2018 | Dukhovlinov ......... C12N 15/10 |
| 2018/0340745 | A1 * | 11/2018 | Rauch ............... B01D 45/16 |
| 2020/0290912 | A1 * | 9/2020 | Guillet ............... C03B 3/005 |

FOREIGN PATENT DOCUMENTS

| | | |
|---|---|---|
| GB | 857904 A | 1/1961 |
| WO | 9119683 A1 | 12/1991 |

OTHER PUBLICATIONS

"Advanced Melting Technologies with Submerged Combustion", By: L.S. Pioro, I.L.Pioro, B.S. Soroka, and T.O. Kostyuk, Copyright 2010, ISBN: 978-1-4349-9463-9, www.rosedogbookstore.com.

* cited by examiner

BATCH CHARGER FOR A MELTING CHAMBER

This patent application discloses devices and methods of glass manufacturing, and more particularly, devices and methods to deliver raw glass making materials, frequently referred to as glass batch into a furnace or melter, especially a submerged combustion melter.

BACKGROUND

During glass manufacturing, especially when using the technique of submerged combustion melting ("SCM"), the introduction of raw glass batch materials to an SCM glass furnace or melting chamber can cause dust and batch particulate carryover into the furnace exhaust. Feeding the raw batch materials into the melter within the turbulent flue gas phase in the melter atmosphere can cause this particulate matter carryover, which often must be filtered out of the exhaust gas with the use of bagging processes or other pollution control equipment that can be expensive and problematic to operate. At times, water may be added to the dry batch materials in an attempt to reduce the dusting, but this can cause agglomeration of the batch materials or they may become sticky which can lead to plugging of the equipment and may also require additional energy within the furnace to melt the materials due to the water addition.

Feeding the raw glass batch materials directly into the molten glass within the furnace can reduce the dust particulate carryover, but it can also lead to two engineering challenges. One challenge is heat damage of the feeding equipment due to the close proximity of the feeding equipment with the location of the high temperature glass and furnace, as typical furnaces can be maintained at 1000° C. to 2000° C., or higher. Another challenge is to prevent the molten glass in the melter from entering the charger, as the high temperature molten glass can clog the charger or damage the equipment.

BRIEF SUMMARY OF THE DISCLOSURE

The present disclosure embodies a number of aspects that can be implemented separately from or in combination with each other.

In accordance with one aspect of the disclosure, there is a feed assembly for a melting chamber that has a plurality of walls and at least one submerged burner. The feed assembly has a tubular body being hollow and having a first end and extending to a second end for connecting to one of the plurality of walls. Optionally, the second end can connect to the one of the plurality of walls at least partially below a level of molten glass of the melting chamber. The tubular body also has a port proximate the second end wherein the port has a first port end and tapers radially inwardly to a second port end at the second end. Additionally, the feed assembly includes a screw batch charger disposed within the tubular body and having a first charger end and extending to a second charger end.

In accordance with another aspect of the disclosure, there is provided a method of feeding raw glass materials into a melting chamber having a plurality of walls and at least one submerged burner. The method includes operating a feed assembly, having all or any of the components as described herein, to deliver the raw glass materials into the melting chamber at least partially below a level for molten glass in the melting chamber. The method also including filling the tubular body with the raw glass materials.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

A general object of the present disclosure, in accordance with one aspect thereof, is to provide a batch charger for a furnace or melting chamber, particularly in submerged combustion melting, that minimizes or eliminates the risk of dust and batch particulate carryover in the exhaust that could vary the output glass compositions. Such a batch charger could also eliminate batch water addition system/operation and minimize or eliminate the need for filtration bagging process and pollution control equipment to deal with dust and batch particulate carryover in the furnace exhaust.

In glass manufacturing, raw glass materials are used to form a uniform composition of molten glass that can be subsequently processed into glass objects. The raw glass materials can include a variety of different chemical compositions (e.g., various oxides to form soda-lime-silica glass) and can be mixed with cullet or recycled glass to form a glass batch. The raw glass materials are typically delivered or passed into a melting chamber by way of a glass or batch charger.

One specific type of glass manufacturing is submerged combustion melting (SCM). SCM is a type of melting used in glass manufacturing, in which an air-fuel or oxygen-fuel mixture is injected directly into the pool of molten glass. As combustion gases bubble through the molten glass, they create a high-heat transfer rate and turbulent mixing of the molten glass until it achieves a uniform composition.

A typical submerged combustion melter or furnace has a bottom with an outer wall, a refractory inner wall having an upper surface establishing a floor of the furnace, and a vertical burner passage extending through the inner and outer walls and being submerged in the molten glass. The typical melter also includes a burner extending into the burner passage.

With prevailing batch charging technology for SCM, glass batch materials are charged into the SCM in a gas phase or gas atmosphere within the melter as opposed to being charged directly into the molten glass. It remains a challenge with SCM to mix the raw glass materials and/or cullet without causing dust and batch particulate carryover due to feeding the raw, potentially partial dry, materials into the melter in the turbulent flue gas phase. These particulates often must be filtered out with the use of bagging processes and pollution control equipment. This equipment is often large in size and expensive to obtain and operate. Adding batch water to wet the batch only helps to limit the carryover, but it will increase the cost of the operation, maintenance and energy use.

Figure 1:
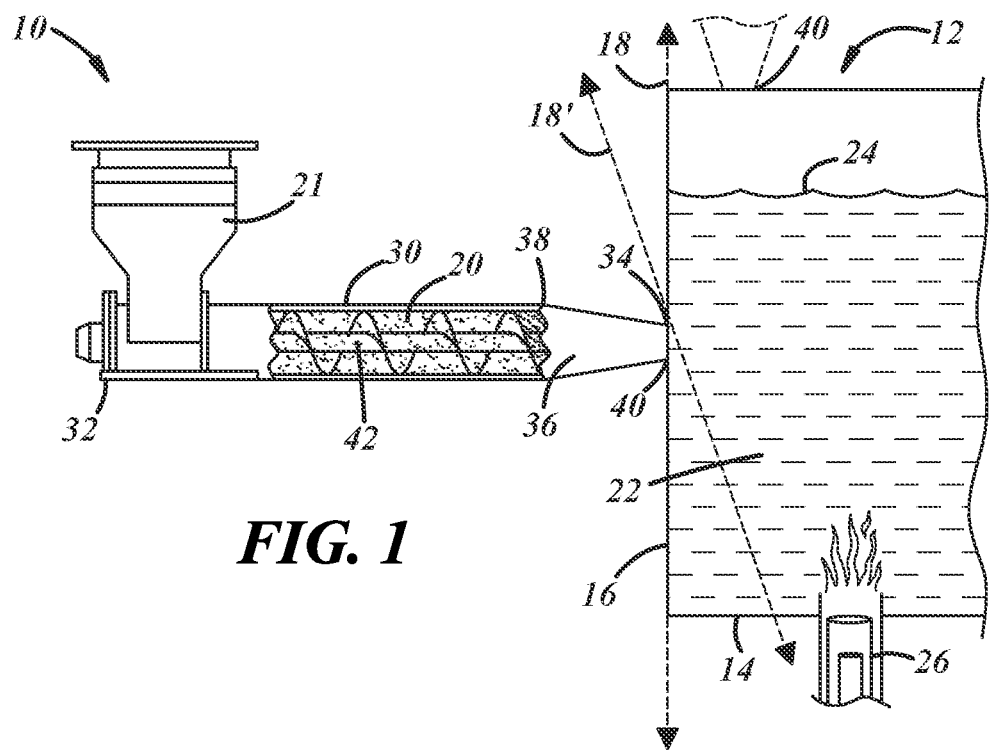
FIG. 1 is a schematic, fragmentary, side view of a feed assembly for a melting chamber in accordance with an illustrative embodiment of the present disclosure.

In order to reduce or eliminate the particulates created with delivering the raw glass materials into the melting chamber, FIG. 1 illustrates a feed assembly 10 that delivers these raw materials directly into a melting chamber 12. The feed assembly 10 is for the melting chamber 12 that has a plurality of walls. These walls include a roof or top wall, side walls (e.g., side wall 16), and a bottom wall 14 or floor. The side wall 16 has a longitudinal axis 18 that is depicted in FIG. 1 to be perpendicular, or 90°, with respect to the feed assembly 10. It will be appreciated that a longitudinal axis of bottom wall 14 may be perpendicular to the longitudinal axis 18 and parallel to the feed assembly 10. The longitudinal axis of the bottom wall 14 could be the same as a horizontal axis.

It will also be appreciated that the feed assembly 10 could be at a variety of adjustable angles with respect to the longitudinal axis 18. In particular, the feed assembly 10 could be angled with respect to the longitudinal axis 18 of the side wall 16 and the longitudinal axis of the bottom wall 14, or the horizontal axis.

Alternatively, the feed assembly 10 could be angled with respect to the longitudinal axis 18 of the side wall 16 and parallel to the longitudinal axis of the bottom wall 14, or the horizontal axis. In this alternative aspect, the side wall 16 could be angled with respect to the horizontal axis so that it is not perpendicular, or 90°, to the longitudinal axis of the bottom wall 14 and, instead, the longitudinal axis 18' of the side wall 16 forms a different angle with respect to the longitudinal axis of the bottom wall 14. This alternative aspect is depicted with the sloping longitudinal axis 18' in FIG. 1. For example, the angle between the longitudinal axis 18 of the side wall 16 and the horizontal axis could be between 90° and 180°, including all ranges, subranges, and values therebetween.

In one specific aspect, the angle between the longitudinal axis 18 of the side wall 16 and the longitudinal axis of the bottom wall 14 could be 135°. If the angle between the longitudinal axis 18 of the side wall 16 and the longitudinal axis of the bottom wall 14 is different than 90, this geometry may help to avoid any batch or raw materials falling into and/or getting trapped in a 90°, lower corner in the melting chamber 12, which could create a dead zone in which the raw batch materials are not mixed with the rest of the molten glass in the melter.

Also, the feed assembly 10 could be attached at the top wall of the melting chamber 12 so that it is parallel to the longitudinal axis 18 of the side wall 16 and/or a vertical axis. An angle of 0° between the feed assembly 10 and the longitudinal axis 18 of the side wall 16 indicates that these two components are parallel with respect to each other. In this particular aspect, the angle between the feed assembly 10 and the longitudinal axis of the bottom wall 14 could be 90°.

Raw glass batch materials 20 are filled or loaded into the feed assembly 10 by way of a funnel 21 or other similar structure and delivered to the melting chamber 12 where they are uniformly mixed and melted to form molten glass 22. A top level 24 of the molten glass 22 depicts the top surface of the molten glass 22 in the melting chamber 12. The molten glass 22 is melted by way of a plurality of burners, including at least one submerged burner 26 that extends through one of the plurality of walls (e.gs., the bottom wall 14 or side wall 16). It will be appreciated that the feed assembly 10 disclosed herein could be specific for and/or attached to a submerged combustion melter.

The feed assembly 10 includes a tubular body 30 that is generally hollow for passing the raw glass materials 20 therethrough and has a first end 32 and extends to a second end 34 for connecting to one of the plurality of walls and at least partially below the level 24 of the molten glass 22 in the melting chamber 12. The level 24 may be the interface between the glass and the gas atmosphere within the melting chamber. Particularly in FIG. 1, the second end 34 of the tubular body 30 connects to the side wall 16 of the melting chamber 12.

By delivering the raw glass materials 20 at least partially below the level 24, the design can significantly eliminate particulate carryover and related dust in the exhaust. This can reduce or even eliminate the need for the bagging equipment to combat the created dust, extend the useful life of the melting chamber, and/or reduce maintenance needs when compared with delivering the raw glass materials 20 above the level 24.

While FIG. 1 depicts delivery of the raw glass materials 20 below the level 24, it will be appreciated that it is possible to deliver the raw glass materials 20 at any altitude located between the melting chamber's top wall and bottom wall 14, including being above the level 24, below the level 24, or partially submerged into the level 24 such that a portion of the raw glass materials 20 are delivered above the level 24 and a portion of the raw glass materials 20 are delivered below the level 24. Delivery of a portion of the raw glass materials 20 below the level 24 can have the advantage of at least partially reducing particulate carryover and dust when compared to delivery of all of the raw glass materials 20 above the level 24.

The tubular body 30 also includes a port 36 that is proximate the second end 34. In the case of the feed assembly, "proximate" means closer to the melting chamber 12 and "distal" means farther from the melting chamber 12. The port 36 has a first port end 38 and tapers radially inwardly to a second port end 40 at the second end 34. As is visible in FIG. 1, the port 36 tapers, or reduces in height and/or diameter, as it extends from the first port end 38 to the second port end 40, towards the melting chamber 12. The taper may create a truncated cone shape in the port 36. Additionally, depending on the degree of the taper, the cross-sectional area of the second port end 40 can be variable so that different geometries can allow different amounts of raw glass materials 20 to pass through the second port end 40 in a given time period. It is appreciated that although the port is described as a cone, the cross section of the port may be of any shape such as rectangular or other, the important feature is that the cross-sectional area decreases from the first port end 38 to the second port end 40 regardless of the shape.

The feed assembly 10 also includes a batch charger 42 disposed within the tubular body 30. The batch charger 42 has a first charger end and extends to a second charger end, both of which are at least partially obscured in FIG. 1. While the batch charger depicted is a screw batch charger, it will be appreciated that other types of chargers are possible and within the scope of this disclosure, such as those that deliver raw glass materials by longitudinally pushing the materials into the furnace (e.g., a reciprocating piston, reciprocating plunger, or the like, with an energy source that is electric, pneumatic, hydraulic, and/or mechanical to cause motion).

Figure 2:
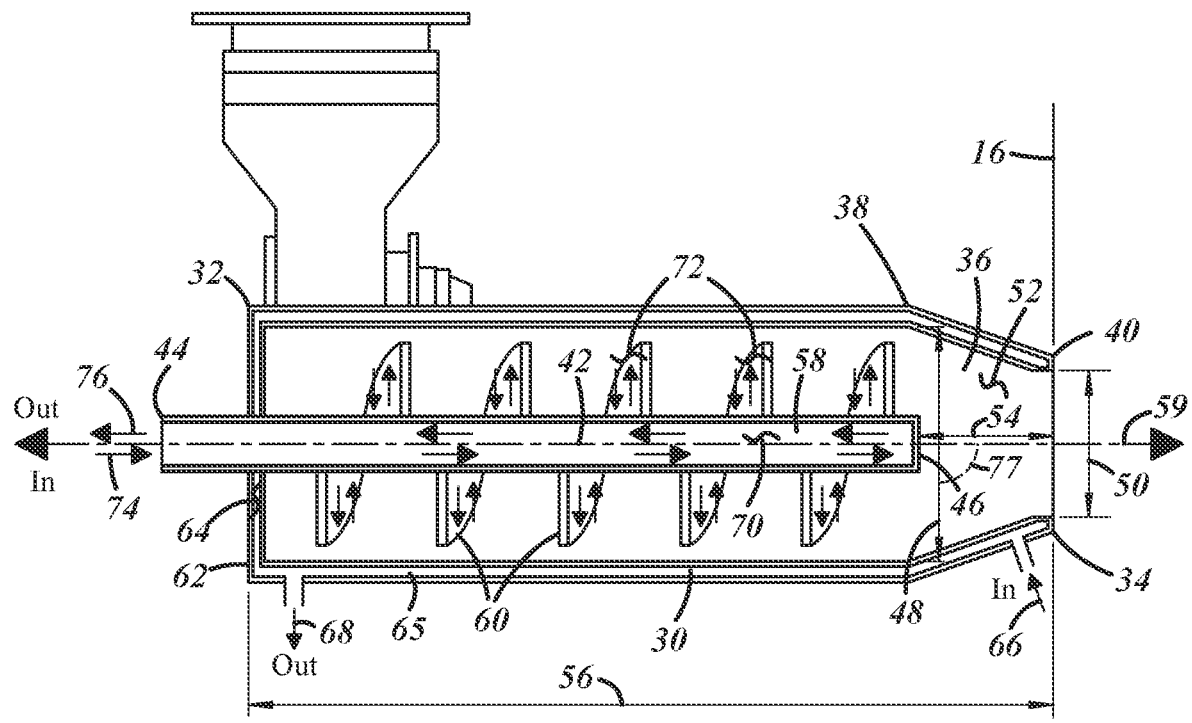
FIG. 2 is a schematic, sectional, side view of the feed assembly of FIG. 1.

FIG. 2 depicts further details of the feed assembly 10 and the batch charger 42. The sectional view of FIG. 2 shows that a first charger end 44 is at or adjacent the first end 32 of the tubular body 30 and a second charger end 46 is spaced away from the second end 34 of the tubular body 30 and the second port end 40 to provide a port space 52 for, or to be filled with, the raw glass batch materials 20. In the case of the feed assembly 10, "adjacent" means nearby, but not necessarily next to.

The second charger end 46 can be distal the second end 34 of the tubular body 30 and the first port end 38. In other words, the second charger end 46 can be spaced with respect to, and shorter than, the first port end 38 or the base of the truncated cone. Alternatively, the second charger end 46 can extend to be aligned with the first port end 38, both being distal the second end 34. In other words, the second charger end 46 can be positioned at or aligned with the base of the truncated cone or may be distal or spaced from the base of the truncated cone.

The port space 52 can be completely filled with the raw glass batch materials 20 so that no molten glass 22 can flow into the port 36 during operation. In other words, the port space 52, within the port 36, provides a location to build up the raw glass materials 20, or glass batch, and create a pressure against the hot molten glass in the melting chamber 12 to prevent the glass from flowing into the charger. Thus, the port space 52 provides the advantage of protecting the components of the feed assembly 10 from the high temperatures of the molten glass 22. Not only can the molten glass 22 damage the feed assembly due to its temperature, but the feed assembly 10 is maintained at a lower temperature than the melting chamber 12. Therefore, if the molten glass 22 were able to flow into the feed assembly 10, it could cool down and cause the raw batch materials to clog or otherwise prohibit further raw glass batch materials 20 from entering the melting chamber 12. Thus, the taper in the port 36 protects against equipment malfunction and damage.

More specifically, the port 36 has a first height 48, or diameter in a circular port, at the first port end 38. The port 36 tapers to a smaller, second height 50 at the second port end 40. The second height 50 is between one fifth (⅕) and four fifths (⅘), including all ranges, subranges, and values therebetween, of the first height 48 to allow the raw glass materials to sufficiently accumulate and create a flow pressure in the port 36 before they enter the melting chamber 12. Specifically, the second height 50 can be approximately half (½) of the first height 48.

Additionally, the port space 52 can have a first length 54 between the second charger end 46 and the second end 34 so that the first length 54 is approximately one twentieth (1/20) to approximately seven tenths (7/10), including all ranges, subranges, and values therebetween, of a second length 56 of the tubular body 30 between the first and second ends 32, 34. In other words, the range is five hundredths (5/100) to seventy hundredths (70/100). For purposes of this disclosure, "approximately" means that a given quantity is within 10%, preferably within 5%, more preferably within 1%, of a comparison value (e.g., two heights or lengths are within 1% of each other or a comparison value). It is appreciated that the port may be of any cross-sectional shape, as long as the cross-sectional area decreases from the first port end 38 to the second port end 40.

Because the port 36 tapers radially inwardly from the first port end 38 to the second port end 40, this taper creates an increase in pressure, and a decrease in flow rate, of the raw glass batch materials 20 at the second end 34 to be greater than any pressure created by the molten glass in the melting chamber 12 and resist flow of the molten glass into the charger feed assembly. If the taper in port 36 were to extend in the opposite direction such that the port 36 widened as it extended from the first port end 38 to the second port end 40, increasing in height, this design would likely not be able to create a sufficiently greater pressure than the pressure of the turbulent molten glass to prevent flow into the charger feed assembly. With this type of widening, the turbulent molten glass would likely have a greater pressure than the raw glass materials and flow into the feed assembly. Such an expanded second port end 40 can cause high temperature molten glass to move into the batch charger 42, damaging the internal components and clogging the batch charger's proper function. The hot molten glass can be particularly damaging to the rotation of the batch charger 42 and its components.

In addition to the port space 52, FIG. 2 depicts that the raw glass materials 20 are delivered by the batch charger 42 with a central rotation shaft 58 and one or more screw flights (e.g., a screw flight 60) extending from the central rotation shaft 58. The central rotation shaft 58 can turn or rotate about the central axis 59 and, correspondingly, turn the screw flight 60 in a screw-type fashion to move the raw glass materials 20 towards the melting chamber 12. As can be seen, the central rotation shaft 58 can be shorter than the second length 56 of the tubular body 30 to accommodate and provide for the port space 52. Alternatively, the central rotation shaft 58 may partly extend into the port space 52 and still maintain the function of the port space 52.

In order to maintain the appropriate temperature in the feed assembly 10, many parts of the feed assembly 10 may be cooled by way of circulating a coolant. As discussed above, it may be desirable to maintain the feed assembly 10 at a relatively cooler temperature than the melting chamber 12 to avoid damaging components of the feed assembly 10 and/or prematurely melting the raw glass materials 20 so that they soften, become sticky, and clog or slow the feed assembly 10 or damage the equipment. In order to do this, coolant 65 can be circulated in a variety of voids present in at least one of the tubular body 30 or the batch charger 42.

For example, as shown in FIG. 2, the tubular body 30 has an outer wall 62 that can extend around the entire, or at least a portion of, the perimeter of the tubular body 30. The outer wall 62 forms a void 64 for circulating coolant 65. The outer wall 62 can include a first coolant inlet 66 at or proximal to the second end 34 and a first coolant outlet 68 distal to the second end 34 so that lower temperature coolant 65 enters proximal the second end 34 then exits distal the second end 34. In this way, colder coolant 65 will cool relatively hotter parts of the feed assembly 10, being closer to the melting chamber 12. As the colder coolant 65 absorbs this heat, it will be moved farther away from the melting chamber 12 to cooler areas of the feed assembly 10 at the first coolant outlet 68. The coolant 65 could be used for fully cooling the tubular body 30.

It will be appreciated that the outer wall 62 and corresponding void 64 could be formed such that the coolant 65 circulates around only a portion of the tubular body 30. For example, the outer wall 62 could be formed such that the void 64 only exists in a front section of the tubular body 30, or around the port 36. The outer wall 62 could also be formed to circulate the coolant 65 in a back section of the tubular body 30, or around the first end 32.

Additionally, and/or alternatively to void 64, the central rotation shaft 58 will have an interior that forms a second void or void 70 for circulating coolant 65 within the central rotation shaft 58. The central rotation shaft 58 has a second coolant inlet 74 at or adjacent the first end 32 for coolant 65 to enter and a second coolant outlet 76 also at or adjacent the first end 32 for coolant 65 to exit. In this way, the coldest coolant 65 enters the second coolant inlet 74, flows down the central rotation shaft 58, and returns back to an adjacent location at the second coolant outlet 76.

Additionally, and/or alternatively to void 70, the screw flight 60 can have its own interior, third void or void 72, which exist throughout the interior of the screw flight 60 for cooling. The coolant 65 that enters through the second coolant inlet 74 can also flow into void 72 before it exits through the second coolant outlet 76. By cooling any or all of the outer wall 62, the central rotation shaft 58, or the screw flight 60 with coolant 65, the raw glass batch materials 20 remain at a lower temperature and are less likely to soften, become sticky, and/or melt to clog and/or reduce the flow rate in the feed assembly 10. The coolant 65 itself can be a number of known industrial coolants, including water, oils or other fluids, and/or various additional or alternative chemical components.

Just as with first void 64 in the outer wall 62, the second and third voids 70, 72 could fully or only partially cool the central rotation shaft 58 and/or the screw flight 60, respectively. For example, void 70 could extend in the central rotation shaft 58 at only a front portion that is located anywhere from approximately midway between the first and second charger ends 44, 46 and to the second charger end 46. Additionally, and/or alternatively, void 72 could extend in the screw flight 60 at only a front portion that is located anywhere from approximately midway between the first and second charger ends 44, 46 and to the second charger end 46. Partial cooling of the central rotation shaft 58 and/or the screw flight 60 could also include cooling in a back portion of these components that is from approximately midway between the first and second charger ends 44, 46 and to the first charger end 44.

The tubular body 30 and the central axis 59 form an angle 77 with the longitudinal axis 18 of the one of the plurality of walls (e.g., side wall 16) to which the tubular body 30 connects. As depicted in FIGS. 1-2, this angle 77 is approximately 90° so that the central axis 59 and the longitudinal axis 18 are perpendicular, taking into consideration manufacturing and engineering tolerances. However, the angle 77 between these two axes 18, 59 can be any desired angle, including between 0° and 90°, for example 45°. The angle 77 could also be 80°. Different angles 77 may provide the advantage of utilizing gravity flow to deliver the raw glass materials 20 into the melting chamber 12, while the angle 77 of 90° may more fully utilize the mechanical components of the batch charger 42 to deliver the raw glass materials 20 into the melting chamber 12. Additionally, the angle 77 of 0° could mean that the feed assembly is connected to a top wall of the melting chamber 12.

Figure 3A:
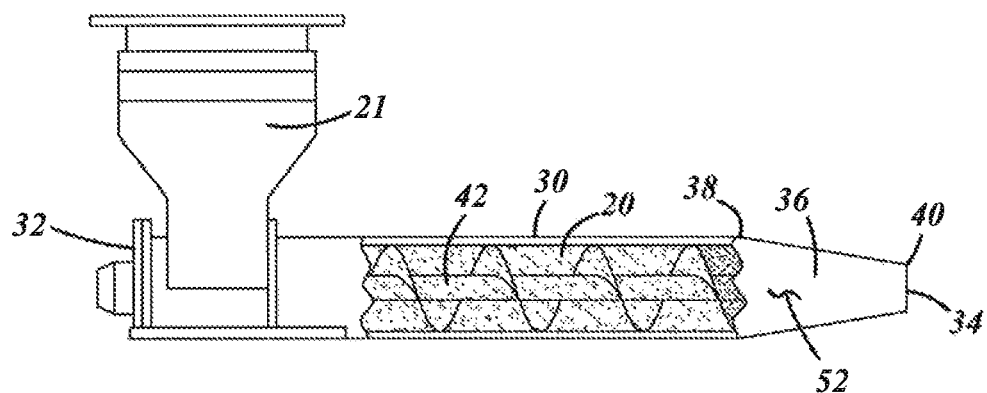
FIGS. 3A-B are schematic, sectional, side views of the feed assembly of FIG. 1 during operation.
Figure 3B:
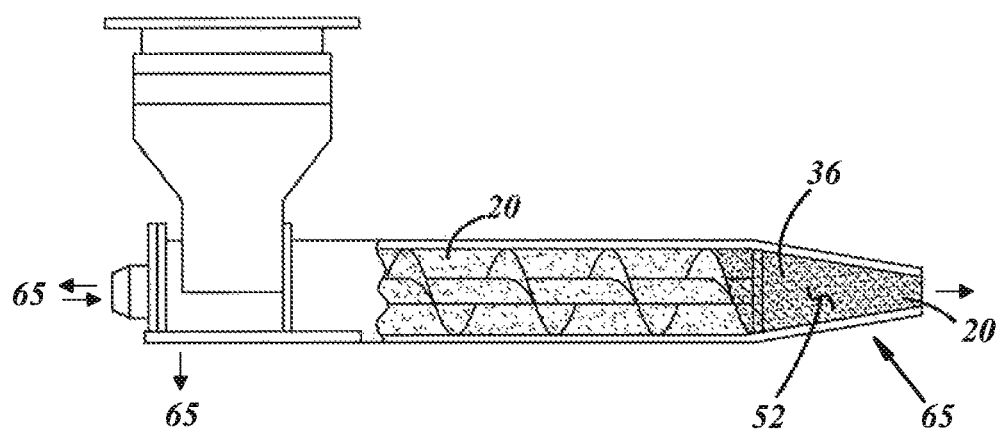

FIGS. 3A-B further illustrate operation of the feed assembly. In operation, the feed assembly may deliver the raw glass materials 20 into the melting chamber below the level of the molten glass in the melting chamber. The method includes filling the tubular body 30 with the raw glass batch materials 20. As depicted with FIG. 2, the method includes circulating the coolant 65 in at least one of the voids of the outer wall, central rotation shaft, or screw flight. The coolant is introduced into one or both of the first and second coolant inlets and is withdrawn out of one or both of the first and second coolant outlets, with the colder coolant 65 entering at the port 36 being closest to the hotter components of the feed assembly proximate the melting chamber 12. The method step of filling the tubular body 30 with the raw glass materials 20 includes filling the port space 52 within the port 36 with the raw glass materials 20 so that little or no molten glass backflows into the feed assembly.

The batch charger 42 may compact the raw glass materials 20 in the port because the port tapers from a larger perimeter and thus smaller cross-sectional area to a smaller perimeter, smaller cross-sectional area. In this way, the compacted raw glass materials 20 may create the intended pressure differential between the batch charger 42 and the glass within the melting chamber 12. Of course, it is also possible that the raw glass materials 20 are compacted to an approximately equal pressure throughout the batch charger and still create the intended pressure differential between the batch charger 42 and the melting chamber.

It is possible to use more than one of the disclosed feed assemblies 10 for one melting chamber 12, with the feed assemblies 10 having any or all of the disclosed aspects herein. In particular, at least one or more discussed batch chargers, for example batch charger 42, can be used for one submerged combustion melter. With more than one feed assembly 10, or more than one batch charger 42, each can feed different or the same batch compositions into the melting chamber 12, including mixing batch materials, separated batch materials, and/or even powder or densified particulates or granules. For example, each can feed the raw glass materials 20, or a batch composition, of sand, soda, lime, a combination thereof, or the like. In some cases, it may be helpful to preheat some of the raw glass materials 20 (e.g., sand), or preheat the raw glass materials 20 to different temperatures, such that different feed assemblies 10 deliver different portions of the raw glass materials 20 into the melting chamber 10 at different temperatures.

There thus has been disclosed a feed assembly for a melting chamber, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A feed assembly for a melting chamber having a plurality of walls, the feed assembly comprising:
    a tubular body being hollow and having a first end and extending to a second end for connecting to one of the plurality of walls and having an outer wall forming a void for circulating a coolant, the tubular body comprising a port proximate the second end wherein the port has a first port end and tapers radially inwardly to a second port end at the second end such that the second port end has a cross-sectional area that is smaller than that of the first port end, and wherein the tubular body includes a first coolant inlet proximal to the second end and a first coolant outlet proximal to the first end so that coolant enters the tubular body proximal to the second end, flows a full length of the tubular body, and then exits the tubular body proximal to the first end; and
    a batch charger disposed within the tubular body and having a first charger end and extending to a second charger end, wherein the second charger end is spaced away from the second end of the tubular body to provide a port space for raw glass materials, and wherein the batch charger is a screw batch charger having a central rotation shaft and a screw flight extending from the central rotation shaft so that the central rotation shaft and screw flight each form a coolant circulation void for circulating a coolant therein to cool the screw batch charger.

2. The feed assembly of claim 1, wherein the port space has a first length between the second charger end and the second end, and wherein the first length of the port space is approximately one twentieth (1/20) to approximately seven tenths (7/10) of a second length of the tubular body between the first and second ends.

3. The feed assembly of claim 1, wherein the central rotation shaft includes a coolant inlet and a coolant outlet both adjacent each other and the first charger end for circulating the coolant.

4. The feed assembly of claim 1, wherein the second charger end is proximate the first port end.

5. The feed assembly of claim 1, wherein the port has a first height at the first port end and a second height at the second port end, and wherein the port tapers such that the second height is between one fifth (1/5) and four fifths (4/5) of the first height.

6. The feed assembly of claim 5, wherein the port tapers such that the second height is approximately half (1/2) of the first height.

7. The feed assembly of claim 1, wherein the first coolant inlet, the void in the tubular body, and the first coolant outlet form a coolant path that is separate from a coolant path formed by each coolant circulation void in the central rotation shaft and screw flight.

8. A method of feeding raw glass materials into a melting chamber having a plurality of walls, the method comprising:
operating a feed assembly to deliver the raw glass batch materials into the melting chamber, the feed assembly comprising:
a tubular body being hollow and having a first end and extending to a second end for connecting to one of the plurality of walls of the melting chamber, the tubular body comprising a port proximate the second end wherein the port has a first port end and tapers radially inwardly to a second port end at the second end such that the second port end has a cross-sectional area that is smaller than that of the first port end, also having an outer wall forming a coolant circulation void for circulating a coolant, with a coolant inlet in the tapered port proximate to the second end and a coolant outlet proximate the first end so that coolant enters the tubular body proximal to the second end, flows a full length of the tubular body, and exits the tubular body distal to the second end and proximal to the first end to cool the tubular body; and
a batch charger disposed within the tubular body and having a first charger end and extending to a second charger end, wherein the second charger end is spaced away from the second end of the tubular body to provide a port space to fill with the raw glass batch materials, and wherein the batch charger is a screw batch charger having a central rotation shaft and a screw flight extending from the central rotation shaft so that the central rotation shaft and screw flight each form a coolant circulation void for circulating a coolant therein to cool the screw batch charger;
filling the tubular body with the raw glass batch materials; and
circulating the coolant in the voids of the tubular body and the batch charger central rotation shaft and screw flight to cool the tubular body and the screw batch charger.

9. The method of claim 8, wherein the step of circulating the coolant comprises introducing the coolant into a second coolant inlet of the central rotation shaft adjacent the first end and withdrawing the coolant from a second coolant outlet of the central rotation shaft also adjacent the first end.

10. The method of claim 8, wherein the step of operating a feed assembly comprises the port space having a first length between the second charger end and the second end, and wherein the first length of the port space is approximately one twentieth (1/20) to approximately seven tenths (7/10) of a second length of the tubular body between the first and second ends; and
wherein the step of filling the tubular body comprises filling the port space with the raw glass batch materials.

11. An apparatus, comprising:
a melting chamber having a plurality of walls and containing molten glass having a top level; and
a feed assembly comprising:
a tubular body being hollow and having a first end and extending to a second end, the second end of the tubular body being connected to one of the plurality of walls of the melting chamber below the top level of the molten glass contained within the melting chamber, the tubular body comprising a tapered port proximate the second end wherein the tapered port has a first port end and tapers radially inwardly to a second port end at the second end such that the second port end has a cross-sectional area that is smaller than that of the first port end, and also having an outer wall forming a coolant circulation void for circulating a coolant to cool the tubular body, with a coolant inlet in the tapered port proximate to the second end and a coolant outlet proximate the first end so that coolant enters the tubular body proximal to the second end and exits the tubular body distal to the second end and proximal to the first end; and
a batch charger disposed within the tubular body and having a first charger end and extending to a second charger end, wherein the second charger end is spaced away from the second end of the tubular body to provide a port space to fill with the raw glass batch materials, and wherein the batch charger is a screw batch charger having a central rotation shaft and a screw flight extending from the central rotation shaft so that the central rotation shaft and screw flight each form a coolant circulation void for circulating a coolant therein to cool the screw batch charger.

12. The apparatus of claim 11, wherein the tubular body has a central axis that is positioned at a non-zero angle with respect to a longitudinal axis of the one of the plurality of walls of the melting chamber.

13. The apparatus of claim 11, wherein the one of the plurality of walls of the melting chamber is a side wall having the longitudinal axis.

14. The apparatus of claim 13, wherein the non-zero angle is 90°.

15. The apparatus of claim 11, wherein the coolant inlet, the void in the tubular body, and the coolant outlet form a coolant path that is separate from a coolant path formed by each coolant circulation void in the central rotation shaft and screw flight.

16. The apparatus of claim 11, wherein the coolant inlet, the void in the tubular body, and the coolant outlet, and each coolant circulation void in the central rotation shaft and screw flight are configured to maintain the feed assembly at a lower temperature than the melting chamber.

* * * * *